US012659880B2

(12) United States Patent　　　　(10) Patent No.: US 12,659,880 B2
Strauch et al.　　　　　　　　　　　(45) Date of Patent: Jun. 16, 2026

(54) DUTY CYCLE DETERMINATION FOR RADIO FREQUENCY EXPOSURE EVALUATION

(71) Applicant: QUALCOMM Incorporated, San Diego, CA (US)

(72) Inventors: Paul Edward Strauch, Pleasanton, CA (US); Vincent Knowles Jones, IV, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 18/348,034

(22) Filed: Jul. 6, 2023

(65) Prior Publication Data

US 2024/0015669 A1　　Jan. 11, 2024

Related U.S. Application Data

(60) Provisional application No. 63/367,981, filed on Jul. 8, 2022.

(51) Int. Cl.
　　*H04W 52/36*　　　(2009.01)
　　*H04B 1/3827*　　　(2015.01)
　　*H04W 52/02*　　　(2009.01)

(52) U.S. Cl.
　　CPC ........ *H04W 52/367* (2013.01); *H04B 1/3838* (2013.01); *H04W 52/0261* (2013.01)

(58) Field of Classification Search
　　CPC ............ H04W 52/367; H04W 52/0261; H04B 1/3838
　　See application file for complete search history.

(56) References Cited

U.S. PATENT DOCUMENTS

| | | | |
|---|---|---|---|
| 7,245,880 B1 | 7/2007 | Jacobsen | |
| 10,652,833 B2 * | 5/2020 | Nadakuduti | ........ H04W 52/367 |
| 11,304,152 B2 * | 4/2022 | Krenz | ................. H04W 52/367 |
| 12,143,947 B2 | 11/2024 | Meshkati et al. | |
| 2023/0189168 A1 * | 6/2023 | Nadakuduti | ........ H04W 52/367 |
| | | | 370/318 |
| 2023/0246663 A1 * | 8/2023 | Va | ........................... G01S 7/006 |
| | | | 342/52 |
| 2023/0337151 A1 * | 10/2023 | Bertizzolo | .......... H04W 52/146 |
| 2023/0397123 A1 * | 12/2023 | Lou | ...................... H04W 52/346 |

FOREIGN PATENT DOCUMENTS

WO　　　2021147427 A1　　7/2021

OTHER PUBLICATIONS

International Search Report and Written Opinion—PCT/US2023/069745—ISA/EPO—Oct. 17, 2023.

* cited by examiner

*Primary Examiner* — David Bilodeau
(74) *Attorney, Agent, or Firm* — Patterson & Sheridan, L.L.P./Qualcomm

(57) ABSTRACT

Certain aspects of the present disclosure provide techniques and apparatus for duty cycle determination for radio frequency (RF) exposure evaluation. A method of wireless communication by a wireless device includes determining a duty cycle associated with a transmission scenario based at least in part on a past duty cycle associated with the transmission scenario; and transmitting a signal at a transmit power determined based at least in part on the duty cycle and an RF exposure limit.

28 Claims, 10 Drawing Sheets

900

902

Determine a duty cycle associated with a transmission scenario based at least in part on a past duty cycle associated with the transmission scenario

904

Transmit a signal at a transmit power determined based at least in part on the duty cycle and a radio frequency (RF) exposure limit

DUTY CYCLE DETERMINATION FOR RADIO FREQUENCY EXPOSURE EVALUATION

CROSS-REFERENCE TO RELATED APPLICATION(S)

The present application for patent claims benefit of U.S. Provisional Application No. 63/367,981, filed Jul. 8, 2022, which is hereby expressly incorporated by reference herein in its entirety.

INTRODUCTION

Field of the Disclosure

Aspects of the present disclosure relate to wireless communications, and more particularly, to radio frequency (RF) exposure compliance.

Description of Related Art

Wireless communication systems are widely deployed to provide various telecommunication services such as telephony, video, data, messaging, broadcasts, etc. Modern wireless devices (such as cellular telephones) are generally mandated to meet radio frequency (RF) exposure limits set by certain governments and international standards and regulations. To ensure compliance with the standards, such devices may undergo an extensive certification process prior to being shipped to market. To ensure that a wireless device complies with an RF exposure limit, techniques have been developed to enable the wireless device to assess RF exposure from the wireless device and adjust the transmission power of the wireless device accordingly to comply with the RF exposure limit.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description," one will understand how the features of this disclosure provide advantages that include improved wireless communication performance.

Certain aspects of the subject matter described in this disclosure can be implemented in a method for wireless communication by a wireless device. The method generally includes determining a duty cycle associated with a transmission scenario based at least in part on a past duty cycle associated with the transmission scenario; and transmitting a signal at a transmit power determined based at least in part on the duty cycle and a radio frequency (RF) exposure limit.

Certain aspects of the subject matter described in this disclosure can be implemented in an apparatus for wireless communication. The apparatus generally includes a memory, and one or more processors coupled to the memory. The one or more processors are configured to determine a duty cycle associated with a transmission scenario based at least in part on a past duty cycle associated with the transmission scenario, and control transmission of a signal at a transmit power determined based at least in part on the duty cycle and a radio frequency (RF) exposure limit.

Certain aspects of the subject matter described in this disclosure can be implemented in an apparatus for wireless communication. The apparatus generally includes means for determining a duty cycle associated with a transmission scenario based at least in part on a past duty cycle associated with the transmission scenario; and means for transmitting a signal at a transmit power determined based at least in part on the duty cycle and a radio frequency (RF) exposure limit.

Certain aspects of the subject matter described in this disclosure can be implemented in a non-transitory computer-readable medium. The non-transitory computer-readable medium has instructions stored thereon, that when executed by an apparatus, cause the apparatus to perform operations including: determining a duty cycle associated with a transmission scenario based at least in part on a past duty cycle associated with the transmission scenario; and transmitting a signal at a transmit power determined based at least in part on the duty cycle and a radio frequency (RF) exposure limit.

Other aspects provide: an apparatus operable, configured, or otherwise adapted to perform any one or more of the aforementioned methods and/or those described elsewhere herein; a non-transitory, computer-readable medium comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
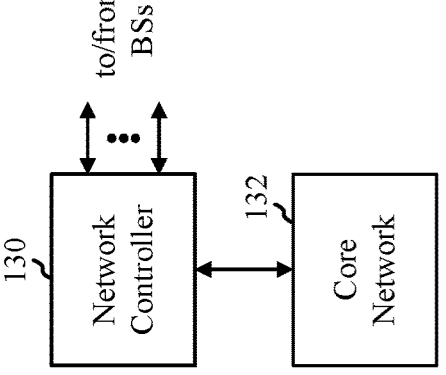
FIG. 1 is a block diagram conceptually illustrating an example wireless communication network.

Aspects of the present disclosure provide apparatus, methods, processing systems, and computer-readable mediums for determining a duty cycle associated with transmissions for radio frequency (RF) exposure evaluation.

A wireless communications device may evaluate RF exposure compliance using a time-averaged operation. The wireless device may perform the RF exposure assessment of past RF exposure over a given time window to determine a maximum allowable transmit power for a future time interval in the time window. In some cases, the wireless device may consider a duty cycle associated with certain transmissions to determine the maximum allowable transmit power, where the duty cycle is indicative of the proportion of time the wireless device transmits during a given time period. For example, if the wireless device is transmitting with a low duty cycle (e.g., less than 10%), the wireless device can use a higher value for the maximum allowable transmit power. If the wireless device is transmitting with a high duty cycle (greater than 80%), the wireless device can use a lower value for the maximum allowable transmit power.

In certain cases, the wireless device can be configured with a duty cycle via the radio access network, for example, according to a time-division duplexing (TDD) uplink-down-link slot pattern in 5G New Radio (NR) systems. The wireless device may determine the duty cycle based on the TDD pattern configured for uplink and downlink communications by the radio access network. For example, the wireless device may obtain a TDD slot pattern indicating that there are eight downlink slots and two uplink slots in a sequence of slots, such that the wireless device is configured with a duty cycle of 20%. In some cases, the wireless device may communicate without a pre-configured duty cycle, for example, via frequency-division duplexing (FDD) or via random channel access methods such as carrier-sense multiple access used for IEEE 802.11 communications.

Aspects of the present disclosure provide apparatus and methods for determining a duty cycle associated with transmissions for RF exposure compliance evaluation. The wireless device may determine the duty cycle based at least in part on a transmission history over a certain time period. In certain aspects, the wireless device may apply smoothing to the duty cycle determination to reduce the influence of rapid changes in the duty cycle. For example, the wireless device may apply an exponential filter with a smoothing factor to determine a weighted average for the duty cycle. The wireless device may determine a maximum allowable transmit power for a future time interval in compliance with a time-averaged RF exposure limit based at least in part on the determined duty cycle.

The apparatus and methods for determining a duty cycle described herein may facilitate improved wireless communication performance (e.g., improved signal quality at the receiver, lower latencies, higher throughput, etc.). For example, the duty cycle may allow the wireless device to allocate a higher maximum allowable transmit power for a future time interval in cases where the duty cycle is low.

As used herein, a radio may refer to a physical or logical transmission path associated with one or more active frequency bands (carriers, channels, bandwidths, subdivisions thereof, etc.), transceivers, and/or radio access technologies (RATs) (e.g., code division multiple access (CDMA), long-term evolution (LTE), NR, IEEE 802.11, Bluetooth, etc.) used for wireless communications. For example, for uplink carrier aggregation in LTE and/or NR, each of the active component carriers used for wireless communications may be treated as a separate radio. Similarly, multi-band transmissions for IEEE 802.11 communications may be treated as separate radios for each band (e.g., 2.4 GHz, 5 GHz, or 6 GHz).

The following description provides examples of RF exposure compliance in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs, or may support multiple RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems and/or to wireless technologies such as 802.11, 802.15, etc.

NR access may support various wireless communication services, such as enhanced mobile broadband (eMBB) targeting wide bandwidth (e.g., 80 MHz or beyond), millimeter wave (mmWave) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability specification(s). These services may also have different transmission time intervals (TTIs) to meet respective quality of service (QoS) specification(s). In addition, these services may co-exist in the same subframe. NR supports beamforming, and beam direction may be dynamically configured. Multiple-input, multiple-output (MIMO) transmissions with precoding may also be supported, as may multi-layer transmissions. Aggregation of multiple cells may be supported.

Example Wireless Communication Network and Devices

FIG. 1 illustrates an example wireless communication network 100 in which aspects of the present disclosure may be performed. For example, the wireless communication network 100 may be an NR system (e.g., a 5G NR network), an Evolved Universal Terrestrial Radio Access (E-UTRA) system (e.g., a 4G network), a Universal Mobile Telecommunications System (UMTS) (e.g., a 2G/3G network), or a code division multiple access (CDMA) system (e.g., a 2G/3G network), or may be configured for communications according to an IEEE standard such as one or more of the 802.11 standards, etc. As shown in FIG. 1, the UE 120a includes an RF exposure manager 122 that ensures RF exposure compliance using a duty cycle determined from past transmission(s), in accordance with aspects of the present disclosure. The UE 120a may be configured to communicate with multiple radio access networks (RANs), such as with a 5G network and a WiFi network, or configured to communicate with a single RAN, for example only a WiFi network or only a Bluetooth network.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell," which may be stationary or may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b, and 110c may be macro BSs for the macro cells 102a, 102b, and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

In certain aspects, the UE 120a may act as an access point (AP) (such as a soft-AP) and communicate with other WiFi clients (e.g., augmented reality (AR) glasses or headset, tablets, etc.) and use the wireless link to the BS 110 as a backhaul to a network (e.g., the Internet). As an example, the UE 120a may stream video from an AP (e.g., another UE or base station) and have a Bluetooth link to a pair of headsets.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

The term "beam" may be used in the present disclosure in various contexts. Beam may be used to mean a set of gains and/or phases (e.g., pre-coding weights or co-phasing weights) applied to antenna elements in the UE and/or BS for transmission or reception. The term "beam" may also refer to an antenna or radiation pattern of a signal transmitted while applying the gains and/or phases to the antenna elements. Other references to beam may include one or more properties or parameters associated with the antenna (radiation) pattern, such as angle of arrival (AoA), angle of departure (AoD), gain, phase, directivity, beam width, beam direction (with respect to a plane of reference) in terms of azimuth and elevation, peak-to-side-lobe ratio, or an antenna port associated with the antenna (radiation) pattern. The term "beam" may also refer to an associated number and/or configuration of antenna elements (e.g., a uniform linear array, a uniform rectangular array, or other uniform array).

Figure 2:
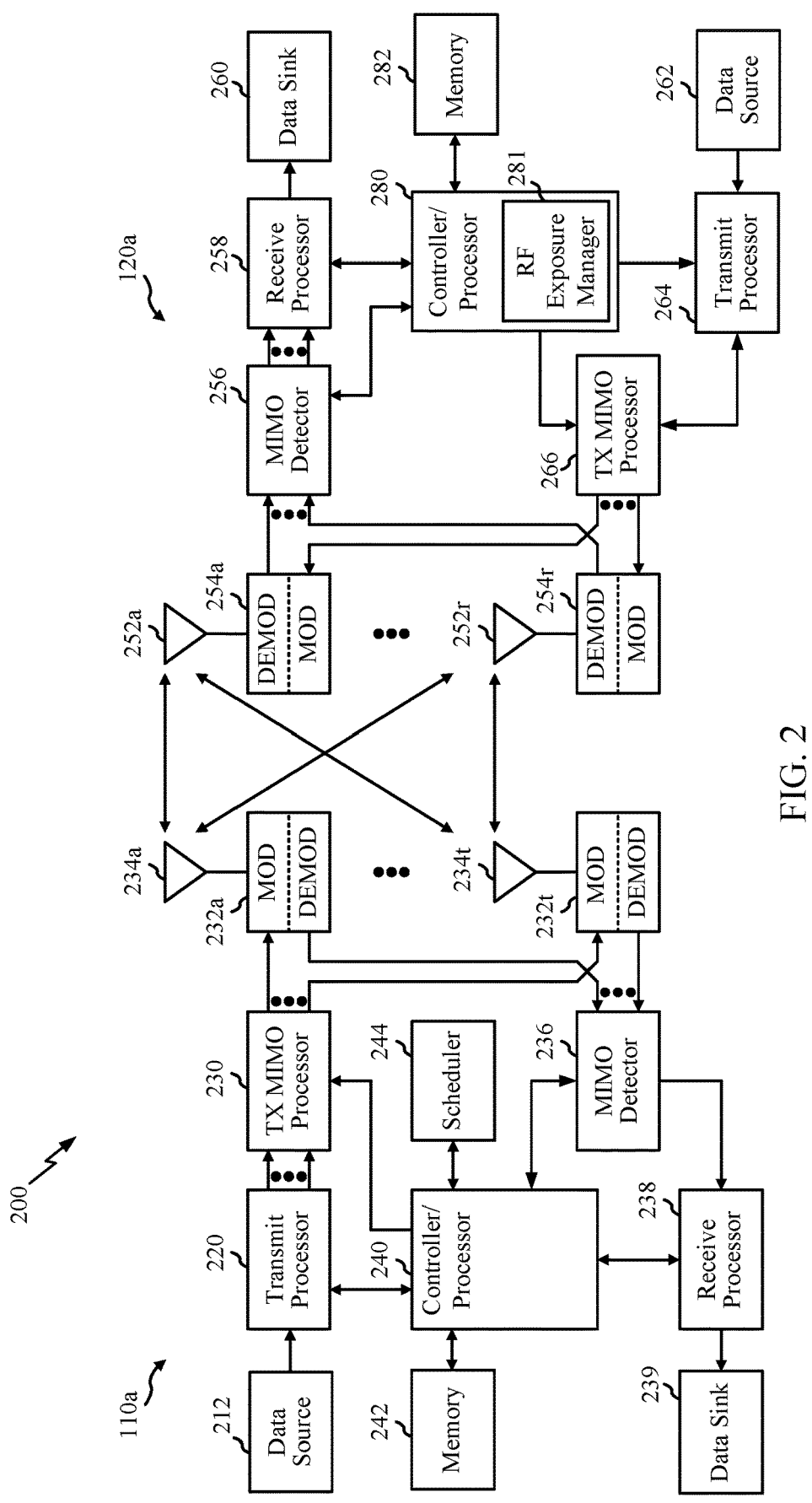
FIG. 2 is a block diagram conceptually illustrating a design of an example base station (BS) and user equipment (UE).

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for orthogonal frequency division multiplexing (OFDM), etc.) to obtain an output sample stream. Each of the transceivers 232a-232t may further process (e.g., convert to analog, amplify, filter, and upconvert) the output sample stream to obtain a downlink signal. Downlink signals from the transceivers 232a-232t may be transmitted via the antennas 234a-234t, respectively.

At the UE 120a, the antennas 252a-252r may receive the downlink signals from the BS 110a and may provide received signals to the transceivers 254a-254r, respectively. The transceivers 254a-254r may condition (e.g., filter, amplify, downconvert, and digitize) a respective received signal to obtain input samples. Each demodulator (DEMOD) in the transceivers 232a-232t may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has an RF exposure manager 281 that is representative of the RF exposure manager 122, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands. For example, a subband may cover multiple resource blocks (RBs).

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In some aspects, the BS 110a illustrated in FIG. 2 and described above is an example of another UE 120.

Example RF Transceiver

Figure 3:
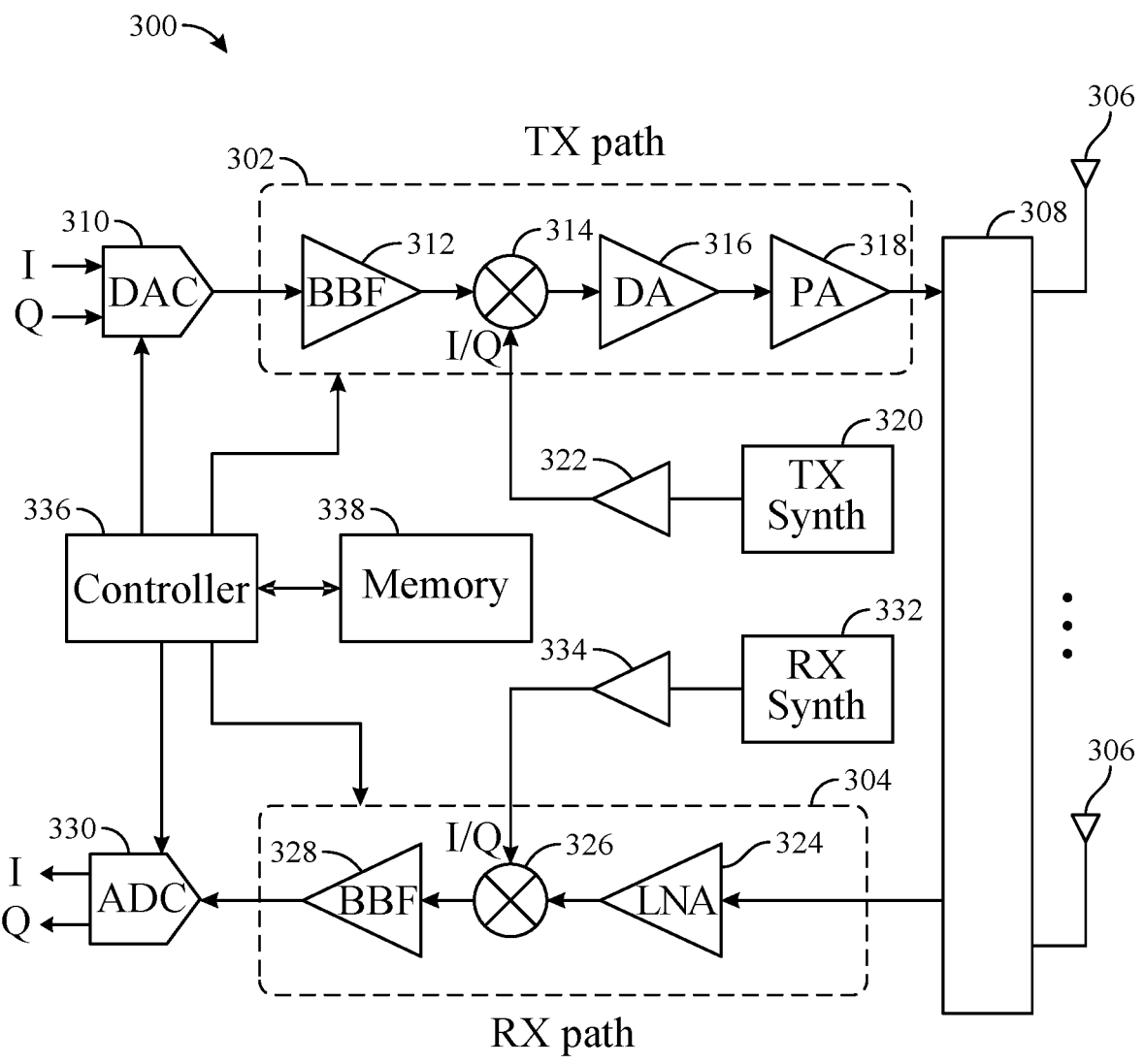
FIG. 3 is a block diagram of an example radio frequency (RF) transceiver.

FIG. 3 is a block diagram of an example RF transceiver circuit 300, in accordance with certain aspects of the present disclosure. The RF transceiver circuit 300 includes at least one transmit (TX) path 302 (also known as a transmit chain) for transmitting signals via one or more antennas 306 and at least one receive (RX) path 304 (also known as a receive chain) for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, and the DA 316 may be included in one or more radio frequency integrated circuits (RFICs). The PA 318 may be external to the RFIC(s) for some implementations.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 314 are typically RF signals, which may be amplified by the DA 316 and/or by the PA 318 before transmission by the antenna 306. While one mixer 314 is illustrated, several mixers may be used to upconvert the filtered baseband signals to one or more intermediate frequencies and to thereafter upconvert the intermediate frequency signals to a frequency for transmission.

The RX path 304 may include a low noise amplifier (LNA) 324, a mixer 326, and a baseband filter (BBF) 328. The LNA 324, the mixer 326, and the BBF 328 may be included in one or more RFICs, which may or may not be the same RFIC that includes the TX path components. RF signals received via the antenna 306 may be amplified by the LNA 324, and the mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I or Q signals for digital signal processing.

Certain transceivers may employ frequency synthesizers with a voltage-controlled oscillator (VCO) to generate a stable, tunable LO with a particular tuning range. Thus, the transmit LO may be produced by a TX frequency synthesizer 320, which may be buffered or amplified by amplifier 322 before being mixed with the baseband signals in the mixer 314. Similarly, the receive LO may be produced by an RX frequency synthesizer 332, which may be buffered or amplified by amplifier 334 before being mixed with the RF signals in the mixer 326.

A controller 336 may direct the operation of the RF transceiver circuit 300, such as transmitting signals via the TX path 302 and/or receiving signals via the RX path 304. The controller 336 may be a processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 338 may store data and program codes for operating the RF transceiver circuit 300. The controller 336 and/or memory 338 may include control logic. In certain cases, the controller 336 may determine a transmit power applied to the TX path 302 (e.g., certain levels of gain applied to the BBF 312, the DA 316, and/or the PA 318) that complies with an RF exposure limit set by country-specific regulations and/or international standards as further described herein.

Example RF Exposure Compliance

RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of milliwatts per square centimeter (mW/cm$^2$). In certain cases, a maximum permissible exposure (MPE) limit in terms of PD may be imposed for wireless devices using transmission frequencies above 6 GHz. The MPE limit is a regulatory metric for exposure based on area, e.g., an energy density limit defined as a number, X, watts per square meter (W/m$^2$) averaged over a defined area and time-averaged over a frequency-dependent time window in order to prevent a human exposure hazard represented by a tissue temperature change.

SAR may be used to assess RF exposure for transmission frequencies less than 6 GHz, which cover wireless communication technologies such as 2G/3G (e.g., CDMA), 4G (e.g., LTE), 5G (e.g., NR in 6 GHz bands), IEEE 802.11ac, etc. PD may be used to assess RF exposure for transmission frequencies higher than 6 GHz, which cover wireless communication technologies such as IEEE 802.11ad, 802.11ay, 5G in mmWave bands, etc. Thus, different metrics may be used to assess RF exposure for different wireless communication technologies.

A wireless device (e.g., UE 120) may simultaneously transmit signals using multiple wireless communication technologies. For example, the wireless device may simultaneously transmit signals using a first wireless communication technology operating at or below 6 GHz (e.g., 3G, 4G, 5G, etc.) and a second wireless communication technology operating above 6 GHz (e.g., mmWave 5G in 24 to 60 GHz bands, IEEE 802.11ad or 802.11ay). In certain aspects, the wireless device may simultaneously transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD. As used herein, sub-6 GHz bands may include frequency bands of 300 MHz to 6,000 MHz in some examples, and may include bands in the 6,000 MHz and/or 7,000 MHz range in some examples.

In certain cases, compliance with an RF exposure limit may be performed as a time-averaged RF exposure evaluation within a specified time window (T) (e.g., 2 seconds for mmWave or 60 GHz bands, 100 or 360 seconds for bands ≤6 GHz, etc.) associated with the RF exposure limit.

Figures 4A, 4B, 4C:
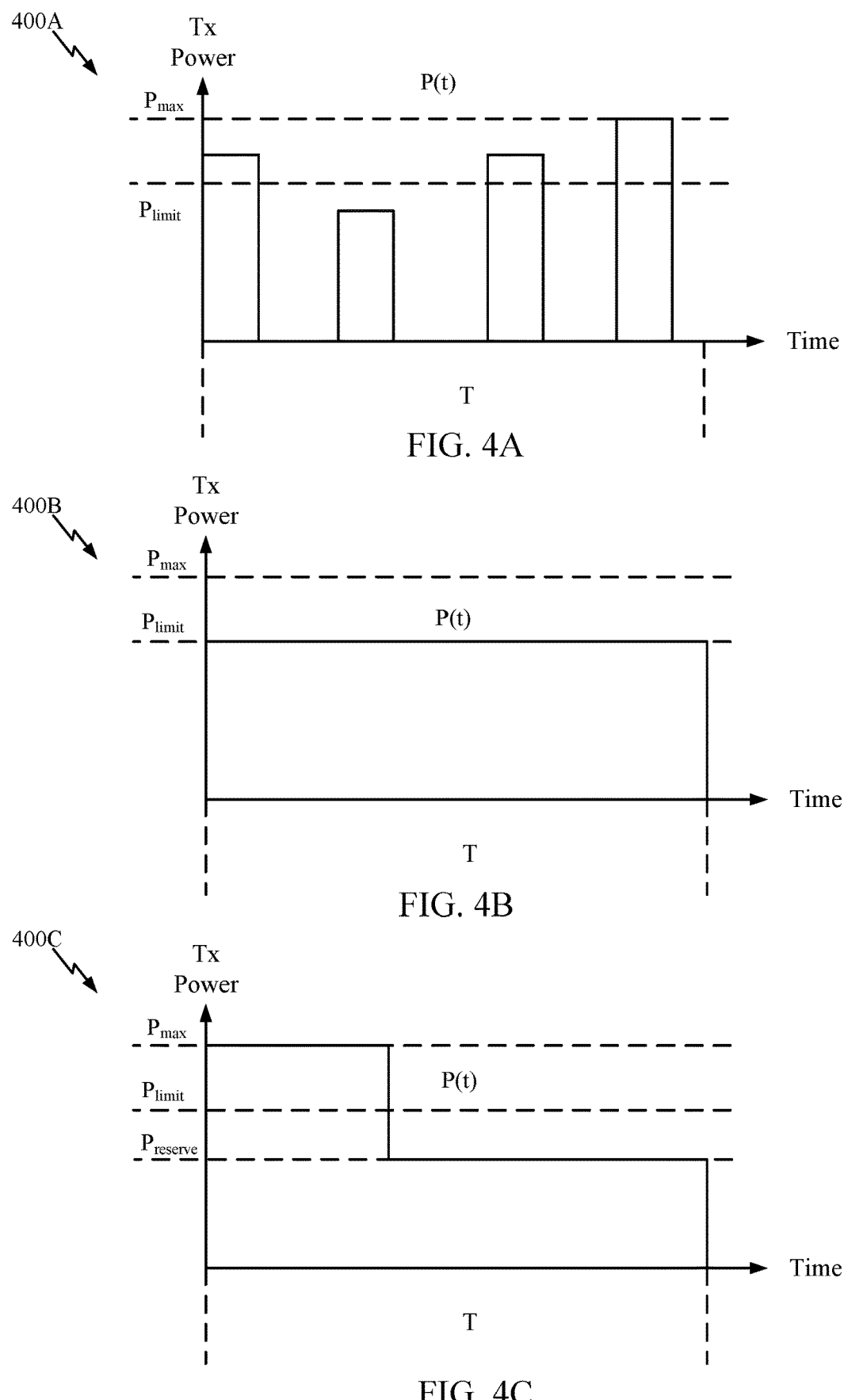
FIGS. 4A, 4B, and 4C are graphs illustrating examples of transmit powers over time in compliance with a time-averaged RF exposure limit.

FIG. 4A is a graph 400A of a transmit power over time (P(t)) that varies over a time window (T) associated with the RF exposure limit, in accordance with certain aspects of the present disclosure. As an example, the instantaneous transmit power may exceed a maximum time-averaged transmit power level $P_{limit}$ in certain transmission occasions in the time window (T). That is, the transmit power may be greater than the maximum time-averaged transmit power level $P_{limit}$. In certain cases, the UE may transmit at $P_{max}$, which is the maximum transmit power supported by the UE. In certain cases, the UE may transmit at a transmit power less than or equal to the maximum time-averaged transmit power level $P_{limit}$ in certain transmission occasions. The maximum time-averaged transmit power level $P_{limit}$ represents the time-averaged threshold in terms of transmit power for the RF exposure limit over the time window (T), and in certain cases, $P_{limit}$ may be referred to as the maximum time-averaged power level or limit, or in terms of exposure, the maximum time-averaged RF exposure level or limit. The graph 400A also illustrates gaps between transmission bursts, where the gaps represent periods during which no transmission was output from the device.

In certain cases, the transmit power may be maintained at the maximum time-averaged transmit power level (e.g., $P_{limit}$) allowed for RF exposure compliance that enables continuous transmission during the time window. For example, FIG. 4B is a graph 400B of a transmit power over time (P(t)) illustrating an example where the transmit power is limited to $P_{limit}$, in accordance with certain aspects of the present disclosure. As shown, the UE can transmit continuously at $P_{limit}$ in compliance with the RF exposure limit.

FIG. 4C is a graph 400C of a transmit power over time (P(t)) illustrating a time-averaged mode that provides a reserve power to enable a continuous transmission within the time window (T), in accordance with certain aspects of the present disclosure. As shown, the transmit power may be backed off from the maximum instantaneous power ($P_{max}$) to a reserve power ($P_{reserve}$) so that the UE can continue transmitting at the lower power ($P_{reserve}$) to maintain a continuous transmission during the time window (e.g., maintain a radio connection with a receiving entity). In FIG. 4C, the area between $P_{max}$ and $P_{reserve}$ for the time duration of $P_{max}$ may be equal to the area between $P_{limit}$ and $P_{reserve}$ for the time window T, such that the area of transmit power (P(t)) in FIG. 4C is equal to the area of $P_{limit}$ for the time window T. Such an area may be considered using 100% of the energy (transmit power or exposure) to remain compliant with the time-averaged RF exposure limit. Without the reserve power $P_{reserve}$, the transmitter may transmit at $P_{max}$ for a portion of the time window with the transmitter turned off for the remainder of the time window to ensure compliance with the time-averaged RF exposure limit. In some aspects, $P_{reserve}$ is set at a fixed power used to serve for a purpose (e.g., reserving power for certain communications). The transmit duration at $P_{max}$ may be referred to as the burst transmit time (or high power duration). When more margin is available in the future (after T seconds), the transmitter may be allowed to transmit at a higher power again (e.g., in short bursts at $P_{max}$).

In some aspects, the UE may transmit at a power that is higher than the average power level, but less than $P_{max}$ in the time-averaged mode illustrated in FIG. 4C. While a single transmit burst is illustrated in FIG. 4C, it will be understood that the UE may instead utilize a plurality of transmit bursts within the time window (T), for example, as described herein with respect to FIG. 4A, where the transmit bursts may be separated by periods during which the transmit power is maintained at or below $P_{reserve}$. Further, it will be understood that the transmit power of each transmit burst may vary (either within the burst and/or in comparison to other bursts), and that at least a portion of the burst may be transmitted at a power above the maximum average power level (e.g., $P_{limit}$).

While FIGS. 4A-4C illustrate continuous transmission over a window, occasion, burst, etc., it will be understood that a duty cycle for transmission may be implemented. In such implementations, a transmit power may be zero periodically and maintained at a higher level (e.g., a level as illustrated in FIGS. 4A-4C) during other portions of the duty cycle. The duty cycle of the transmission may be indicative of a portion (e.g., 5 ms) of a specific period (e.g., 500 ms) in which one or more signals are transmitted. The duty cycle may be a ratio of the portion to the specific period. In certain cases, the duty cycle may be standardized (e.g., predetermined) with a specific RAT and/or vary over time, for example, due to changes in radio conditions, mobility, user behavior, channel availability, etc.

Example Duty Cycle Determination for Radio Frequency Exposure Evaluation

Multi-mode/multi-band UEs have multiple transmit antennas, which may simultaneously transmit in sub-6 GHz bands and bands greater than 6 GHz bands, such as mmWave bands. As described herein, the RF exposure of sub-6 GHz bands may be evaluated in terms of SAR, and the RF exposure of bands greater than 6 GHz may be evaluated in terms of PD. Due to the regulations on simultaneous exposure, the wireless device may limit maximum transmit power for both sub-6 GHz bands and bands greater than 6 GHz.

Aspects of the present disclosure provide apparatus and methods for determining a duty cycle associated with transmissions for RF exposure evaluation. The wireless device may determine the duty cycle based at least in part on a transmission history over a certain time period. In certain aspects, the wireless device may apply smoothing to the duty cycle determination to reduce the influence of rapid changes in the duty cycle. For example, the wireless device may apply an exponential filter with a smoothing factor to determine a weighted average for the duty cycle. The wireless device may determine a maximum allowable transmit power for a future time interval in compliance with a time-averaged RF exposure limit based at least in part on the determined duty cycle.

In some cases, the duty cycle may be determined as described herein when the wireless device is not configured with a duty cycle, for example, according to a TDD pattern. For example, in wireless local area network (WLAN) systems, wireless devices access the channel using carrier-sense multiple access where a wireless device may communicate when a channel is detected as being idle. In FDD systems, a wireless device may communicate in a full-duplex fashion in different subcarriers without a predefined slot pattern.

The apparatus and methods for determining a duty cycle described herein may facilitate improved wireless communication performance (e.g., improved signal quality at the receiver, lower latencies, higher throughput, etc.). For example, the duty cycle may allow the wireless device to allocate a higher maximum allowable transmit power for a future time interval in cases where the duty cycle is (or was) low.

Figure 5:
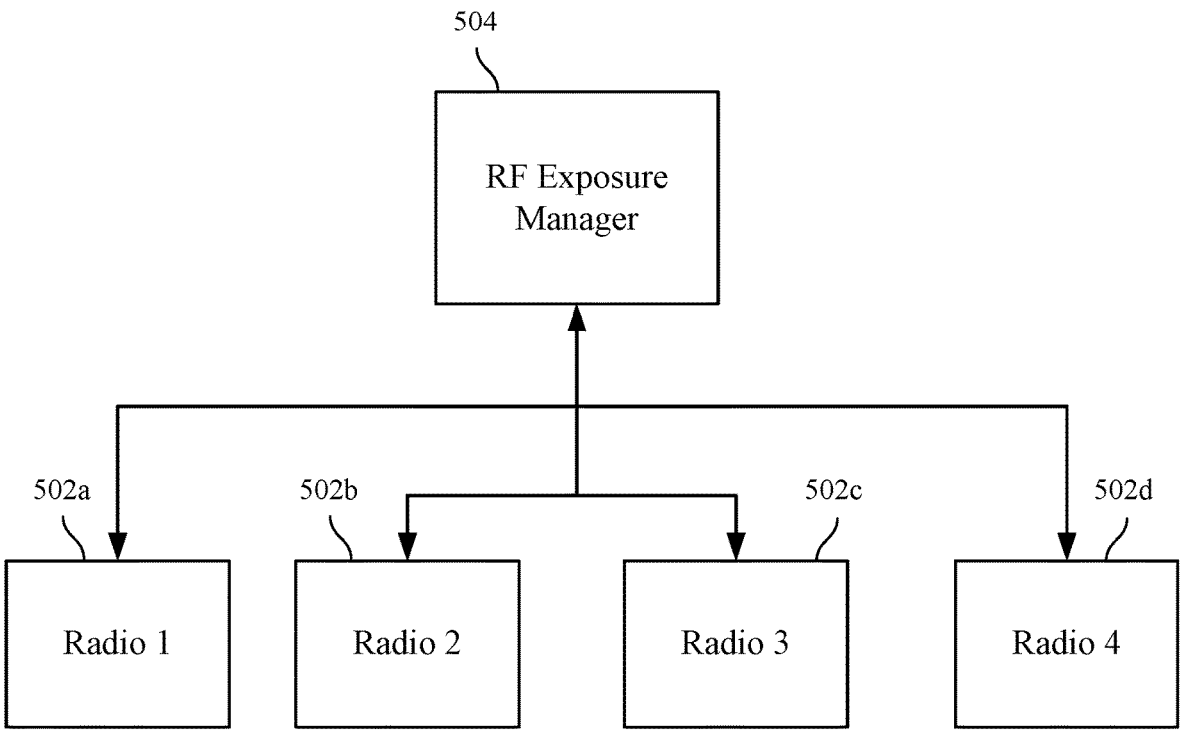
FIG. 5 is a diagram of an example processing architecture for evaluating RF exposure across multiple radios.

For certain aspects, the RF exposure evaluation may be performed using a centralized processing architecture. FIG. 5 is a diagram of an example logical processing architecture for evaluating RF exposure across multiple radios 502a-d of a wireless device. The radios 502a-d (e.g., Radio 1, Radio 2, etc.) may request certain values for reserves and/or margins from a central algorithm or controller, such as an RF exposure manager 504 (e.g., RF exposure manager 281 of FIG. 2). Each radio 502a-d may provide the requested values for the reserves and/or margins on a periodic basis (e.g., every 500 milliseconds) and/or in response to certain event(s). Each radio 502a-d may also report a transmit power report indicating an RF exposure history for a certain time period (e.g., 500 milliseconds) associated with a time-averaging time window. In certain aspects, the transmit power report may include the total normalized RF exposure exhibited per antenna and/or antenna group associated with the radio.

The RF exposure manager 504 may determine the reserves and/or margins for each of the radios 502a-d, for example, based on the requested values from the individual radios and the transmit power report. As an example, the RF exposure manager 504 may use the requested values as initial values for determining the reserves and margins for the respective radios 502a-d and adjust the values, for example, depending on the RF exposure history of some or all of the radios. The RF exposure manager 504 may provide, to each of the radios 502a-d, the total allowed energy allocation for a corresponding time interval and/or values determined for the reserves and margins. The RF exposure manager 504 may provide the energy allocations on a periodic basis (e.g., every 500 milliseconds) and/or in response to certain event(s).

Each of the radios 502a-d may operate using a separate RF exposure compliance algorithm, for example, according to a time-averaged RF exposure limit, a fixed RF exposure limit, etc. For example, the first radio 502a (Radio 1) may operate using a time-averaged RF exposure limit in determining transmit powers in compliance with the RF exposure limit, where the first radio 502a (Radio 1) may operate according to the examples described herein with respect to FIGS. 4A-4C. The second radio 502b (Radio 2) may operate using a fixed RF exposure limit, where the second radio 502b (Radio 2) only allows transmit powers equal to or less than a fixed transmit power limit, such as $P_{limit}$.

In certain aspects, a controller or modem (e.g., one or more processors and/or one or more modems) may perform the functionality of the RF exposure manager 504. A modem associated with wireless wide area network (WWAN) communications may perform the functionality of the RF exposure manager 504. As an example, the first radio 502*a* (Radio 1) may perform the RF exposure operations for sub-6 GHz bands in 5G NR; the second radio 502*b* (Radio 2) may perform the RF exposure operations for mmWave bands in 5G NR; the third radio 502*c* (Radio 3) may perform RF exposure operations for wireless local area network (WLAN) communications; and the fourth radio 502*d* (Radio 4) may perform RF exposure operations for Bluetooth communications. In some cases, the modem associated with WWAN communications may be in a sleep mode where the RF exposure manager 504 may temporarily refrain from evaluating the RF exposure for some or all of the radios 502*a-d*. The sleep mode may be due to the modem operating in a discontinuous reception (DRX) mode or an airplane mode, for example, where WWAN communications are temporarily disabled. Some of the radios (e.g., Bluetooth and/or WLAN radio(s)) may operate an RF exposure compliance algorithm independently of the RF exposure manager to maintain RF exposure compliance, for example, when the centralized RF exposure manager is in sleep mode. Aspects described herein, for example as described with respect to FIG. 6, may be performed when the RF exposure manager 504 is operational or in a sleep or low power mode, depending on the implementation. In some circumstances, aspects described herein provide particular benefits when the RF exposure manager 504 is in a sleep or low power mode, such as being able to adjust transmit power to regulate a time-averaged exposure (when transmission are random, opportunistic, or otherwise unpredictable or unscheduled) despite not receiving updated power allocations from the RF exposure manager. In certain cases, the control operation of the RF exposure manager may be referred to as an outer loop (OL) operation, and the RF exposure compliance operation in communication with the RF exposure manager and performed at a particular radio may be referred to as an inner loop (IL) operation.

It should be appreciated that the RF exposure manager and/or radios depicted in the processing architecture may be implemented in hardware, software, or a combination of both. For example, the RF exposure manager and/or radio(s) in the processing architecture may be implemented in one or more modems, an RF circuit (e.g., a transceiver), memory blocks, registers, processing blocks, and/or in instructions (e.g., software code or executable instructions). The executable instructions may be stored in memory and executed on a processor (e.g., an application processor and/or modem processor).

In some examples, the RF exposure manager is coupled to and configured to manage exposure for radios configured for different RANs, for example as described above. In other examples, the RF exposure manager may be coupled to and configured to manage exposure for one or more radios that are configured to operate using a single RAN, for example WiFi, Bluetooth, or other technology (e.g., a cellular technology). In either of these configurations, the radios which the RF exposure manager is configured to manage may be limited to radios which are configured to communicate on an unlicensed band. In yet other examples, e.g., in a configuration with a single radio, the RF exposure manager is not separate from that radio, but rather is integrated into the radio. In such example, allocations and/or reports may not be communicated back and forth, but rather determination of exposure and transmit power may all be evaluated all within the radio. Other configurations which may also be used with aspects described herein may be possible.

Figure 6:
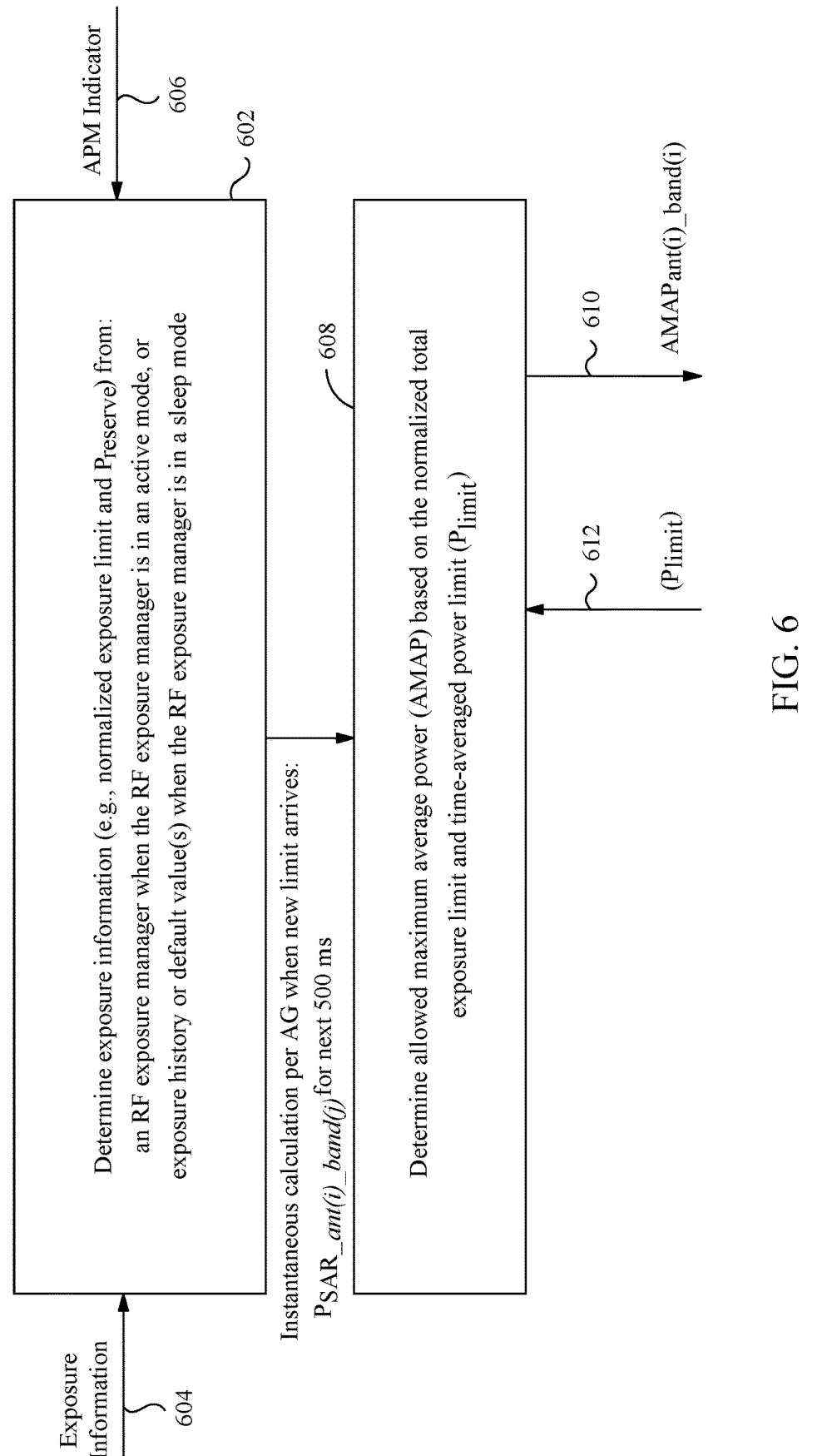
FIG. 6 is a diagram illustrating example operations for determining a maximum averaged power for a radio in communication with an RF exposure manager.

FIG. 6 is a diagram illustrating example operations for determining a maximum averaged power for a radio (e.g., a WLAN radio) in communication with an RF exposure manager, such as one or more of the radios and the RF exposure manager depicted in FIG. 5. In this example, at activity 602, a radio may determine exposure information for one or more antennas associated with the radio. If an RF exposure manager is in an active mode (for example, evaluating the RF exposure for one or more radios), a radio may periodically obtain (e.g., every 500 milliseconds) exposure information 604 from the RF exposure manager. The exposure information 604 may include a normalized total exposure limit and/or a reserve level per antenna and/or antenna group associated with the radio. If the RF exposure manager is in a sleep mode (for example, temporarily refraining from evaluating the RF exposure for one or more radios), the radio may determine the exposure information 604, for example, from exposure history or a default value(s). For example, if the RF exposure manager is in a DRX mode or an airplane mode (APM), the radio may determine a reserve level (e.g., $P_{reserve}$), which may be based on whether other radio(s) (e.g., Bluetooth) are active. If the RF exposure manager is in the sleep mode, the radio may determine a normalized exposure limit based on exposure history or a default value. The radio may obtain an APM indicator 606 indicating whether the WWAN modem is in airplane mode, for example, via an application processor. If the APM indicator 606 indicates that the RF exposure manager is in airplane mode, the radio may trigger determination of the exposure information 604 without the assistance of the RF exposure manager. If the radio does not receive the exposure information 604 from the RF exposure manager after a certain time (e.g., 500 milliseconds), the radio may detect that the RF exposure manager is in a sleep mode and determine the exposure information 604 without the assistance of the RF exposure manager.

At activity 608, the radio may determine an allowed maximum average power (AMAP) 610 per antenna and/or frequency band associated with the radio. The radio may determine the AMAP 610 based at least in part on a normalized total exposure limit (which may be obtained from the RF exposure manager or determined at the radio) and a time-averaged power limit 612 (e.g., $P_{limit}$). The time-averaged power limit may be stored in memory as a table of values for different antennas, frequency bands, RF exposure scenarios (e.g., head exposure, hand or extremity exposure, body exposure, hotspot exposure, etc.), RF exposure categories, surfaces of the wireless device, etc.

Figure 7:
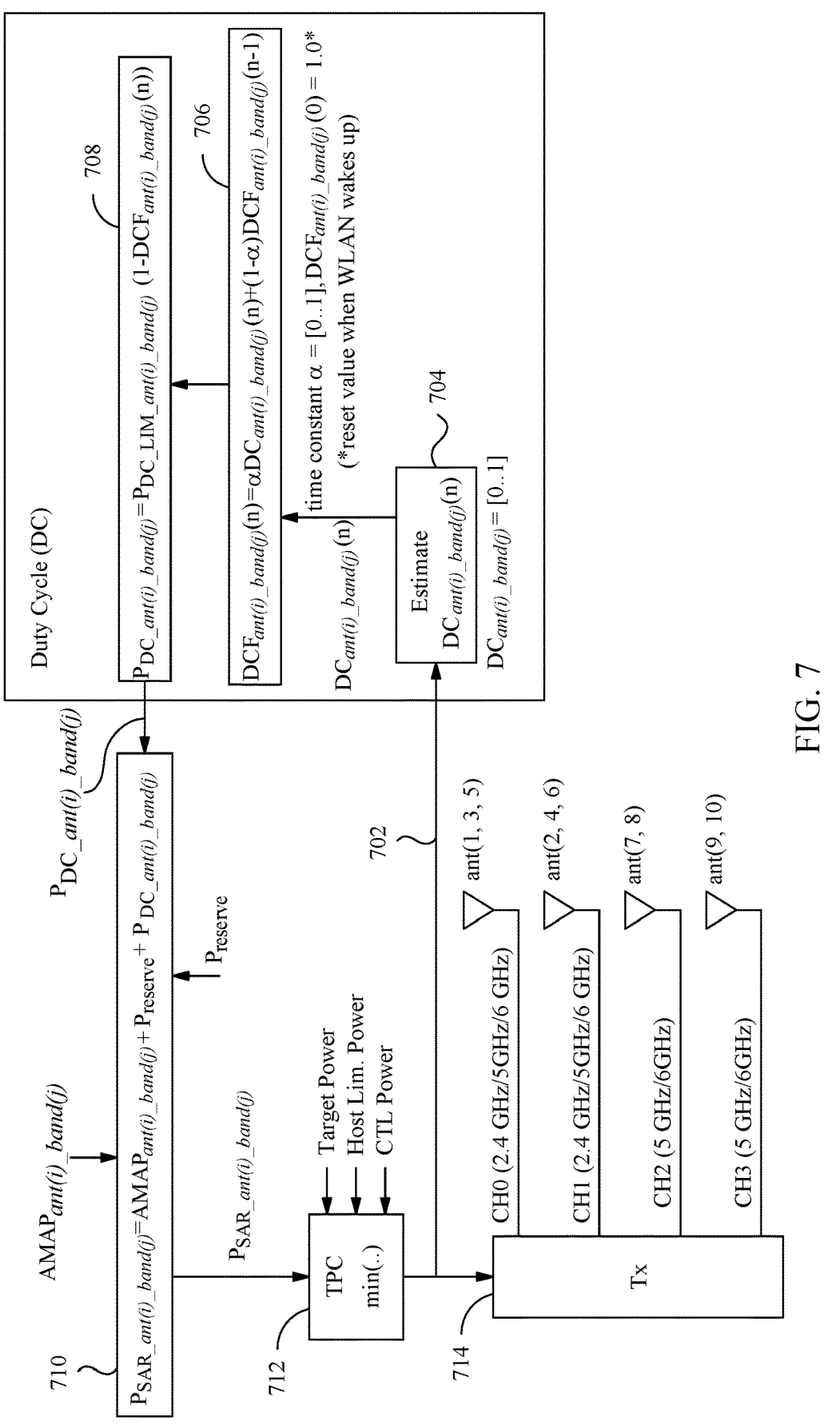
FIG. 7 is a diagram illustrating example operations for determining a maximum allowed transmit power based on a duty cycle.

FIG. 7 is a diagram illustrating example operations for determining a maximum allowed transmit power based on a duty cycle. The operations may be performed by a radio implemented in hardware, software, or a combination of both, for example, as described herein with respect to FIG. 5.

In this example, a radio may determine the maximum allowed transmit power per transmission scenario. The radio may obtain transmission information 702 associated with a certain time interval (e.g., 500 milliseconds), where the transmission information 702 may include the duration of transmission(s) within the time interval. In certain aspects, the transmission information may be associated with a particular transmission scenario, such as one or more antennas and/or one or more frequency band(s). The time interval may be a portion of a time window (e.g., 100 seconds, 360 seconds, etc.) associated with a time-averaged RF exposure limit, such that the time window comprises multiple time intervals including a future time interval and one or more past time intervals. The time interval for the transmission information 702 may be associated with a past time interval, and the corresponding transmission information 702 may be used to determine the transmit power for a future time interval, as further described herein.

At activity 704, the radio may determine (e.g., estimate) a past duty cycle based on the transmission information 702. For example, the duty cycle may be equal to a ratio of the duration of transmission(s) within a time interval to the time interval $$\left(\text{e.g.,}\ \frac{t_{TX}}{T},\right.$$

where $t_{TX}$ is the duration of transmissions within a time interval, and T is the time interval). The duration of transmissions may include the time used for past transmissions in the time interval. The radio may determine the past duty cycle per transmission scenario (e.g., one or more antennas and/or one or more frequency bands) among a plurality of transmission scenarios.

At activity 706, to determine an expected duty cycle, the radio may apply smoothing to the past duty cycle. For example, the radio may determine an expected duty cycle using an exponential filter applied to the past duty cycle. The expected duty cycle may be determined using the exponential filter according to the following expression:

$$DCF_{ant(i)\_band(i)}(n)=\alpha\cdot DC_{ant(i)\_band(i)}(n)+(1-\alpha)\\ DCF_{ant(i)\_band(i)}(n-1) \tag{1}$$

where $DCF_{ant(i)\_band(i)}(n)$ is the filtered duty cycle for a particular antenna and frequency band; $DCF_{ant(i)\_band(i)}(n-1)$ is the duty cycle determined for the previous iteration (e.g., the previous smoothed duty cycle); $DC_{ant(i)\_band(i)}(n)$ is the past duty cycle determined at activity 704 for the antenna and frequency band; and $\alpha$ is a smoothing factor having a value in a range from zero to one. For an initial iteration or when the WLAN radio wakes up from a sleep mode, $DFC_{ant(i)\_band(i)}(0)$ may be set to a default value, such as one (1.0).

At activity 708, the radio may determine a transmit power associated with the duty cycle (e.g., a duty cycle power). The duty cycle power may be indicative of the remaining power available after accounting for the duty cycle. The duty cycle power may be determined as a product of a power limit and a difference of one and the duty cycle, for example, according to the following expression:

$$P_{DC\_ant(i)\_band(i)}=P_{DC\_limit\_ant(i)\_band(i)}\\ (1-DCF_{ant(i)\_band(i)}(n)) \tag{2}$$

where $P_{DC\_ant(i)\_band(i)}$ is the duty cycle power and $P_{DC\_limit\_ant(i)\_band(i)}$ is a power limit associated with the duty cycle. As further described herein with respect to FIG. 8, the power limit may be selected based on the value of the duty cycle. For example, the value of the power limit may be inversely proportional to the duty cycle.

At activity 710, the radio may determine a maximum allowed transmit power (e.g., $P_{SAR}$) based at least in part on the allowed maximum average power (AMAP), a power reserve, and/or the duty cycle power. In some cases, the AMAP may be determined according to the operations described herein with respect to FIG. 6. In other cases, the radio may perform a time-averaged RF exposure operation independent of a central RF exposure manager, such that the radio determines the AMAP based on exposure history tracked by the radio. The maximum allowed transmit power may be determined according to the following expression:

$$P_{SAR_{ant(i)\_band(i)}}=AMAP_{ant(i)\_band(i)}+P_{reserve}+\\ P_{DC\_ant(i)\_band(i)} \tag{3}$$

where $P_{SAR_{ant(i)\_band(i)}}$ is the maximum allowed transmit power for a given time interval; $AMAP_{ant(i)\_band(i)}$ is the maximum averaged power determined based on the exposure history or obtained from an RF exposure manager; $P_{reserve}$ is a reserve power that may provide a base level of power for certain communications (in some cases, $P_{reserve}$ may be a normalized value and converted to decibels via $10\cdot\log_{10}(P_{reserve})$); and $P_{DC\_ant(i)\_band(i)}$ is the duty cycle power, for example, determined at activity 708.

At activity 712, the radio may determine a transmit power used to transmit a signal based at least in part on the maximum allowed transmit power (e.g., $P_{SAR}$). The transmit power may be selected as a smallest value among multiple transmit powers such as a target power, a host limit power, or a control power, where the multiple transmit power may be determined locally or obtained from a network entity (such as an access point). The selected transmit power may also satisfy a threshold such that the transmit power is less than or equal to the maximum allowed transmit power. The radio may output the determined transmit power to a transceiver circuit 714 (e.g., the RF transceiver circuit 300). The transceiver circuit 714 may output a signal at the transmit power using at least one of the corresponding antennas coupled to the transceiver circuit 714.

Figure 8:
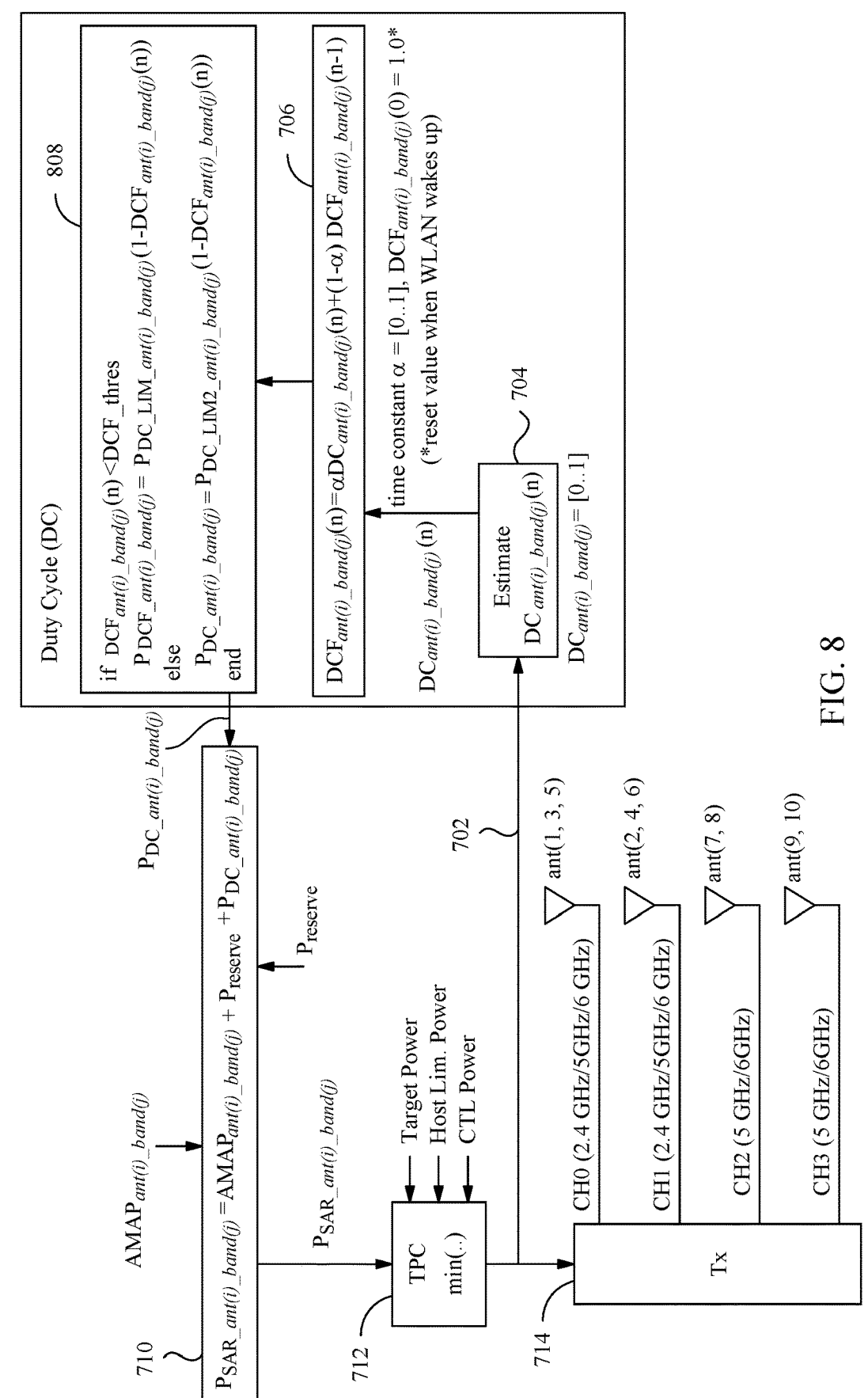
FIG. 8 is a diagram illustrating example operations for determining a maximum allowed transmit power based on a duty cycle with a threshold to determine a duty cycle power.

FIG. 8 is a diagram illustrating example operations for determining a maximum allowed transmit power based on a duty cycle with a threshold to determine a duty cycle power. In this example, the radio may perform the operations described herein with respect to FIG. 7, except for activity 808 where the radio may apply a threshold for determining the duty cycle power. For example, if the duty cycle determined at activity 706 is less than a threshold (e.g., DCF_thres=0.6), the radio may apply a first value (e.g., 6 decibels (dB)) for the power limit in Expression (2); otherwise, if the duty cycle is greater than or equal to the threshold, the radio may apply a second value (e.g., 5 dB) for the power limit in Expression (2). In some cases, the radio may apply multi-tiered thresholds to select a value for the power limit among two or more values. In some cases, the radio may select the value of the power limit in response to a difference of two successive duty cycles (e.g., DCF(n)−DCF(n−1)) satisfying a threshold. If the difference exceeds the threshold, the value of the power limit may be reduced, for example. Adjusting the power limit used to determine the duty cycle power may allow the radio to respond to changes in the duty cycle and ensure RF exposure compliance, for example, when the wireless device transitions from transmitting with a low duty cycle to a high duty cycle or vice versa.

Figure 9:
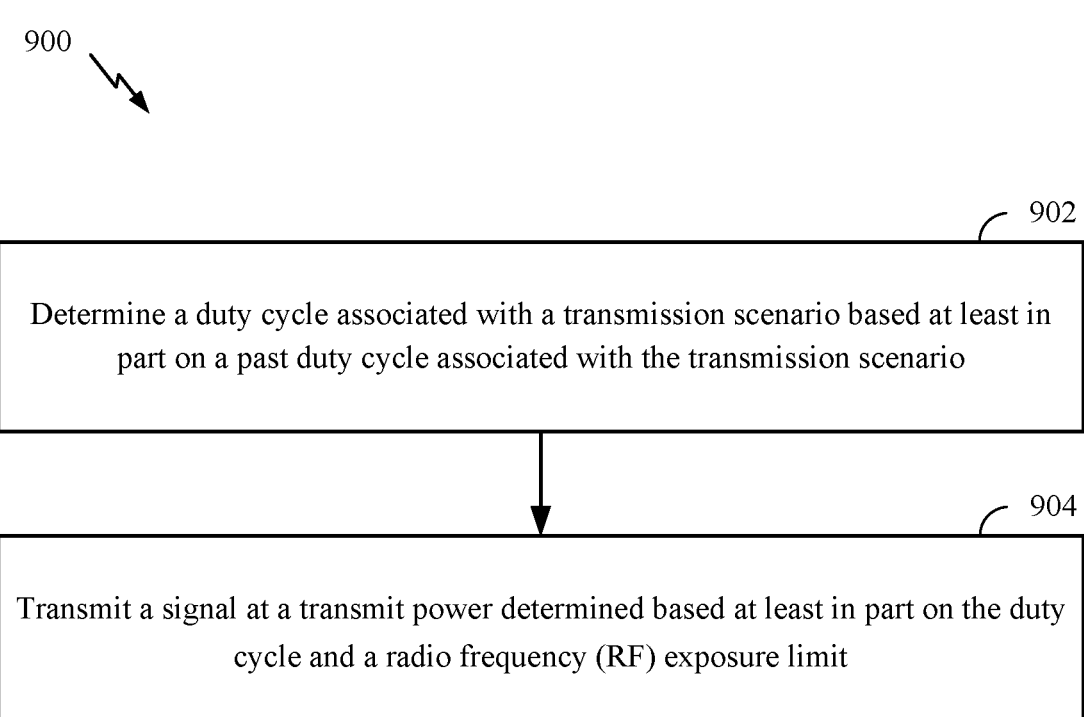
FIG. 9 is a flow diagram illustrating example operations for wireless communication by a wireless device, in accordance with certain aspects of the present disclosure.

FIG. 9 is a flow diagram illustrating example operations 900 for wireless communication, in accordance with certain aspects of the present disclosure. The operations 900 may be performed, for example, by a wireless device (e.g., the UE 120a in the wireless communication network 100). The operations 900 may be implemented as software components that are executed and run on one or more processors (e.g., controller/processor 280 of FIG. 2). Further, the transmission and/or reception of signals by the wireless device in the operations 900 may be enabled, for example, by one or more antennas (e.g., antennas 252 of FIG. 2). In certain aspects, the transmission and/or reception of signals by the wireless device may be implemented via a bus interface of one or more processors (e.g., controller/processor 280) obtaining and/or outputting signals.

The operations 900 may optionally begin, at block 902, where the wireless device may determine a duty cycle (e.g., $DCF_{ant(i)\_band(i)}(n)$) associated with a transmission scenario (e.g., an antenna and/or frequency band) based at least in part on a past duty cycle (e.g., $DC_{ant(i)\_band(i)}(n)$) associated with the transmission scenario. The past duty cycle may be the duty cycle determined for a previous tracking period for time-averaged RF exposure compliance evaluation or for a previous reporting period in a centralized RF exposure architecture as described herein with respect to FIG. 6. For example, the wireless device may determine the duty cycle as described herein with respect to FIG. 7 or FIG. 8. The duty cycle may be associated with a transmission scenario such that the transmission duration used to determine the duty cycle is performed under the transmission scenario. In certain aspects, the transmission scenario may comprise one or more antennas and/or one or more frequency bands. In some cases, the transmission scenario may include a MIMO scenario where multiple antennas are used for transmission. For example, the transmission duration for a particular antenna and/or frequency band of the transmission scenario in a given time interval may be used to determine the duty cycle.

At block 904, the wireless device may transmit a signal at a transmit power determined based at least in part on the duty cycle and a radio frequency (RF) exposure limit. In certain cases, the wireless device may transmit via a single antenna or multiple antennas (and/or antenna modules) simultaneously, where simultaneous transmissions may include transmissions in the same transmission occasion or time interval associated with the RF exposure limit. In some cases, the wireless device may transmit via multiple radios simultaneously. For example, the wireless device may transmit via any combination of a WWAN radio (e.g., CDMA, E-UTRA, NR, etc.), WLAN radio (e.g., IEEE 802.11), and/or Bluetooth radio, simultaneously.

In certain aspects, the duty cycle may be determined using smoothing or filtering applied to the past duty cycle, such as an exponential filter, double exponential smoothing, triple exponential smoothing, and/or a moving average. To determine the duty cycle, the wireless device may determine the duty cycle using an exponential filter applied to the past duty cycle, for example, described herein with respect to Expression (1). The wireless device may determine the duty cycle as a weighted average of the past duty cycle and a previously determined duty cycle (e.g., a previous filtered or smoothed duty cycle). The previously determined duty cycle may be smoothed using an exponential filter, and the previously determined duty cycle may be the value of the previous iteration of the exponential filter. The past duty cycle and the previously determined duty cycle may be weighted using a smoothing factor (e.g., $\alpha$). To determine the duty cycle, the wireless device may determine the past duty cycle as a ratio of time used for one or more past transmissions associated with the transmission scenario in a time interval over the time interval $$\left( e.g., \frac{t_{TX}}{T} \right).$$

For certain aspects, the wireless device may determine the duty cycle per the transmission scenario among a plurality of transmission scenarios. The plurality of transmission scenarios may include different combinations of an antenna and a frequency band among at least one of a plurality of antennas or a plurality of frequency bands. For example, the wireless device may determine a first duty cycle associated with a first antenna and a first frequency band and determine a second duty cycle associated with a second antenna and a second frequency band.

In certain aspects, the wireless device may determine the transmit power based on a duty cycle power (e.g., $P_{DC}$), for example, as described herein with respect to FIG. 7 or FIG. 8. The duty cycle power may be indicative of the energy remaining for a future time interval given the amount of energy used for the past duty cycle. The wireless device may determine the duty cycle power as a product of a power limit (e.g., $P_{DC\_limit\_ant(i)\_band(i)}$) and a difference of one and the duty cycle, for example, as described herein with respect to Expression (2). In some cases, the wireless device may select a value for the power limit depending on the duty cycle, for example, as described herein in connection with FIG. 8. The wireless device may select a first value (e.g., 6 dB) for the power limit if the duty cycle satisfies a threshold (e.g., if the duty cycle is less than (or equal to) the threshold), and the wireless device may select a second value (e.g., 5 dB) for the power limit if the duty cycle does not satisfy the threshold (e.g., if the duty cycle is greater than (or equal to) the threshold).

The wireless device may determine a maximum allowed transmit power for a future time interval in compliance with the time-averaged RF exposure limit based at least in part on the duty cycle. The wireless device may determine the transmit power that is less than or equal to the maximum allowed transmit power. The wireless device may determine the maximum allowed transmit power (e.g., $P_{SAR}$) as a sum of a maximum averaged power (e.g., AMAP), a power reserve (e.g., $P_{reserve}$), and a duty cycle power (e.g., $P_{DC}$), for example, as described herein with respect to FIG. 7 and Expression (3).

In certain aspects, the maximum averaged power may be determined as described herein with respect to FIG. 6. The maximum averaged power may be derived from exposure information obtained from a centralized RF exposure manager, such as a modem associated with a WWAN radio. When the RF exposure manager is temporarily refraining from providing the exposure information, the maximum averaged power may be derived from a normalized exposure limit selected by the WLAN radio or other radio. The wireless device may select the maximum averaged power in response to detecting that a modem associated with a WWAN is in a sleep mode. The sleep mode may include an airplane mode or a discontinuous reception (DRX) mode.

For certain aspects, the maximum averaged power may be determined with assistance from a centralized RF exposure manager, as described herein with respect to FIG. 6. The wireless device may determine the maximum averaged power based at least in part on one or more past transmit powers over a time window associated with the time-averaged RF exposure limit In certain aspects, the wireless device may select the transmit power among a plurality of transmit power values, for example, as described herein with respect to FIG. 7. The wireless device may select the transmit power as a smallest value among a plurality of transmit power values, for example, including a target power, a host limit power, or a control power. The selected transmit power may also satisfy a threshold such that the transmit power is less than or equal to the maximum allowed transmit power.

The RF exposure limit may be a time-averaged RF exposure limit, for example, as described herein with respect to FIGS. 4A-4C. The RF exposure limit may include a time-averaged SAR limit, a time-averaged PD limit, or a combination thereof.

For certain aspects, the duty cycle may be determined as described herein for certain type(s) of wireless communications, such as WLAN communications, Bluetooth communications, and/or WWAN communications with a predetermined duty cycle. The duty cycle may be further associated with one or more transmissions via a shared spectrum, such as WiFi frequency bands and/or Bluetooth bands. The signal may comprise a WiFi signal and/or Bluetooth signal.

While the examples depicted in FIGS. 1-9 are described herein with respect to a UE performing the various methods for providing RF exposure compliance to facilitate understanding, aspects of the present disclosure may also be applied to other wireless devices, such as a wireless station, an access point, a base station and/or a customer premises equipment (CPE), performing the RF exposure compliance described herein. Further, while the examples are described with respect to communications between the UE (or other wireless device) and a network entity, the UE or other wireless device may be communicating with a device other than a network entity, for example another UE or with another device in a user's home that is not a network entity, for example.

It will be appreciated that determining the duty cycle as described herein may enable desirable wireless communication performance, such as reduced latencies, increased (uplink) data rates, and/or increased transmission range (e.g., an uplink connection at the edge of a cell), for example, due to the increased transmit power that can be assigned to transmissions in low duty cycle scenarios.

Example Communications Device

Figure 10:
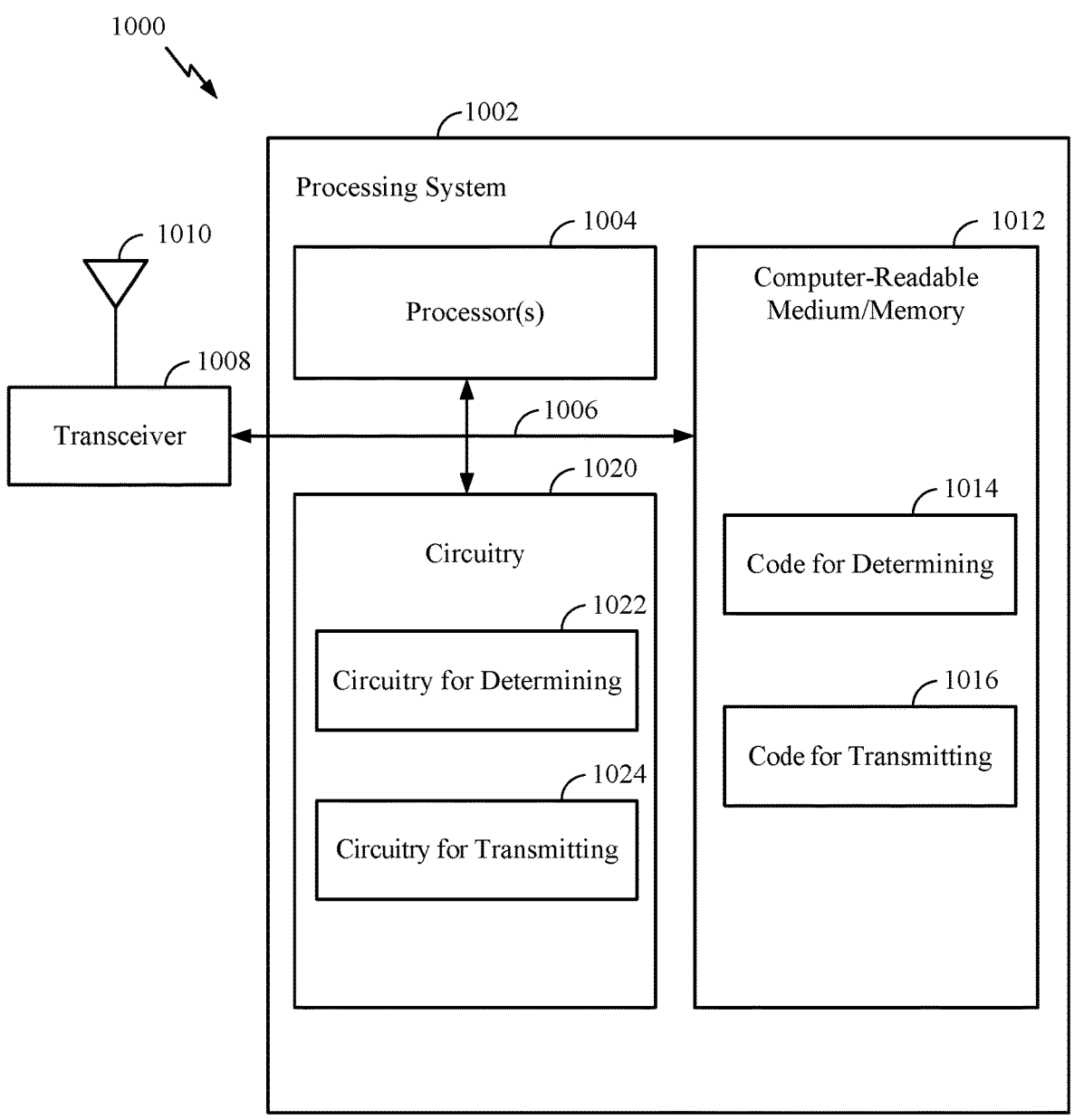
FIG. 10 illustrates a communications device that may include various components configured to perform operations for the techniques disclosed herein, in accordance with certain aspects of the present disclosure.

FIG. 10 illustrates a communications device 1000 (e.g., the UE 120) that may include various components (e.g., corresponding to means-plus-function components) configured to perform operations for the techniques disclosed herein, such as the operations illustrated in FIG. 9. The communications device 1000 includes a processing system 1002, which may be coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 (e.g., one or more processors) coupled to a computer-readable medium/memory 1012 via a bus 1006. In certain aspects, the computer-readable medium/memory 1012 is configured to store instructions (e.g., computer-executable code) that when executed by the processor 1004, cause the communications device 1000 to perform the operations 900 illustrated in FIG. 9, or other operations for performing the various techniques discussed herein for providing RF exposure compliance. In certain aspects, computer-readable medium/memory 1012 stores code for determining (or selecting) 1014, code for transmitting (or outputting) 1016, or any combination thereof.

In certain aspects, the processing system 1002 has circuitry 1020 configured to implement the code stored in the computer-readable medium/memory 1012. In certain aspects, the circuitry 1020 is coupled to the processor 1004 and/or the computer-readable medium/memory 1012 via the bus 1006. For example, the circuitry 1020 includes circuitry for determining (or selecting) 1022, circuitry for transmitting (or outputting) 1024, or any combination thereof.

In some examples, means for transmitting or sending (or means for outputting for transmission) may include the transceivers 254 and/or antenna(s) 252 of the UE 120 illustrated in FIG. 2 and/or transceiver 1008 and antenna 1010 of the communications device 1000 in FIG. 10.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for means for determining and/or means for selecting may include various processing system components, such as: the processor 1004 in FIG. 10, or aspects of the UE 120 depicted in FIG. 2, including receive processor 258, transmit processor 264, TX MIMO processor 266, and/or controller/processor 280.

Example Aspects

Implementation examples are described in the following numbered clauses:

Aspect 1: A method of wireless communication by a wireless device, comprising: determining a duty cycle associated with a transmission scenario based at least in part on a past duty cycle associated with the transmission scenario; and transmitting a signal at a transmit power determined based at least in part on the duty cycle and a radio frequency (RF) exposure limit.

Aspect 2: The method of Aspect 1, wherein the transmission scenario comprises an antenna and a frequency band.

Aspect 3: The method of Aspect 1 or Aspect 2, wherein determining the duty cycle comprises determining the duty cycle using an exponential filter applied to the past duty cycle.

Aspect 4: The method according to any of Aspects 1-3, wherein determining the duty cycle comprises determining the duty cycle as a weighted average of the past duty cycle and a previously determined duty cycle.

Aspect 5: The method of Aspect 4, wherein: the previously determined duty cycle is smoothed using an exponential filter; and the past duty cycle and the previously determined duty cycle are weighted using a smoothing factor.

Aspect 6: The method according to any of Aspects 1-5, wherein determining the duty cycle comprises determining the past duty cycle as a ratio of time used for one or more past transmissions over a time interval.

Aspect 7: The method according to any of Aspects 1-6, wherein determining the duty cycle comprises determining the duty cycle per the transmission scenario among a plurality of transmission scenarios.

Aspect 8: The method of Aspect 7, wherein the plurality of transmission scenarios includes different combinations of an antenna and a frequency band among at least one of a plurality of antennas or a plurality of frequency bands.

Aspect 9: The method according to any of Aspects 1-8, further comprising determining the transmit power based at least in part on a product of a power limit and a difference of one and the duty cycle.

Aspect 10: The method of Aspect 9, further comprising: selecting a first value for the power limit if the duty cycle satisfies a threshold; and selecting a second value for the power limit if the duty cycle does not satisfy the threshold.

Aspect 11: The method according to any of Aspects 1-10, further comprising: determining a maximum allowed transmit power for a time interval in compliance with the RF exposure limit based at least in part on the duty cycle; and determining the transmit power that is less than or equal to the maximum allowed transmit power.

Aspect 12: The method of Aspect 11, wherein: determining the maximum allowed transmit power comprises determining the maximum allowed transmit power as a sum of a maximum averaged power, a power reserve, and a duty cycle power; and the duty cycle power is a product of a power limit and a difference of one and the duty cycle.

Aspect 13: The method of Aspect 11 or Aspect 12, wherein determining the transmit power comprises selecting the transmit power as a smallest value among a plurality of transmit power values.

Aspect 14: The method of Aspect 12 or Aspect 13, further comprising selecting the maximum averaged power in response to detecting that a modem associated with a wireless wide area network is in a sleep mode.

Aspect 15: The method of Aspect 14, wherein the sleep mode comprises an airplane mode or a discontinuous reception mode.

Aspect 16: The method of Aspect 12 or Aspect 13, further comprising determining the maximum averaged power based at least in part on one or more past transmit powers over a time window associated with the RF exposure limit.

Aspect 17: The method according to any of Aspects 1-16, wherein the RF exposure limit includes a time-averaged specific absorption rate limit, a time-averaged power density limit, or a combination thereof.

Aspect 18: The method according to any of Aspects 1-17, wherein the duty cycle is further associated with one or more transmissions via a shared spectrum.

Aspect 19: The method according to any of Aspects 1-18, wherein the signal comprises a WiFi signal.

Aspect 20: The method according to any of Aspects 1-18, wherein the signal comprises a Bluetooth signal.

Aspect 21: An apparatus for wireless communication, comprising: a memory; and one or more processors coupled to the memory, the one or more processors being configured to: determine a duty cycle associated with a transmission scenario based at least in part on a past duty cycle associated with the transmission scenario, and control transmission of a signal at a transmit power determined based at least in part on the duty cycle and a radio frequency (RF) exposure limit.

Aspect 22: The apparatus of Aspect 21, further comprising a transmitter configured to transmit the signal at the transmit power, wherein the transmission scenario comprises an antenna and a frequency band.

Aspect 23: The apparatus of Aspect 21 or 22, wherein to determine the duty cycle, the one or more processors are further configured to determine the duty cycle using an exponential filter applied to the past duty cycle.

Aspect 24: The apparatus of Aspect 21 or 22, wherein to determine the duty cycle, the one or more processors are further configured to determine the duty cycle as a weighted average of the past duty cycle and a previously determined duty cycle.

Aspect 25: The apparatus of Aspect 24, wherein: the previously determined duty cycle is smoothed using an exponential filter; and the past duty cycle and the previously determined duty cycle are weighted using a smoothing factor.

Aspect 26: The apparatus of Aspect 21 or 22, wherein to determine the duty cycle, the one or more processors are further configured to determine the past duty cycle as a ratio of time used for one or more past transmissions over a time interval.

Aspect 27: The apparatus of Aspect 21 or 22, wherein to determine the duty cycle, the one or more processors are further configured to determine the duty cycle per the transmission scenario among a plurality of transmission scenarios.

Aspect 28: The apparatus of Aspect 27, wherein the plurality of transmission scenarios includes different combinations of an antenna and a frequency band among at least one of a plurality of antennas or a plurality of frequency bands.

Aspect 29: The apparatus of any of Aspects 21 to 28, wherein the one or more processors are further configured to determine the transmit power based at least in part on a product of a power limit and a difference of one and the duty cycle.

Aspect 30: The apparatus of Aspect 29, wherein the one or more processors are further configured to: select a first value for the power limit if the duty cycle satisfies a threshold; and select a second value for the power limit if the duty cycle does not satisfy the threshold.

Aspect 31: The apparatus of any of Aspects 21 to 28, wherein the one or more processors are further configured to: determine a maximum allowed transmit power for a time interval in compliance with the RF exposure limit based at least in part on the duty cycle; and determine the transmit power that is less than or equal to the maximum allowed transmit power.

Aspect 32: The apparatus of Aspect 31, wherein: to determine the maximum allowed transmit power, the one or more processors are further configured to determine the maximum allowed transmit power as a sum of a maximum averaged power, a power reserve, and a duty cycle power; and the duty cycle power is a product of a power limit and a difference of one and the duty cycle.

Aspect 33: The apparatus of Aspect 32, wherein the one or more processors are further configured to select the maximum averaged power in response to detecting that a modem associated with a wireless wide area network is in a sleep mode.

Aspect 34: The apparatus of Aspect 32, wherein the one or more processors are further configured to determine the maximum averaged power based at least in part on one or more past transmit powers over a time window associated with the RF exposure limit.

Aspect 35: The apparatus of any of Aspects 21 to 34, wherein the signal comprises a wireless local area network (WLAN) signal or a Bluetooth signal.

Aspect 36: An apparatus, comprising: a memory comprising computer-executable instructions; one or more processors configured to execute the computer-executable instructions and cause the apparatus to perform a method in accordance with any of Aspects 1-20.

Aspect 37: An apparatus, comprising means for performing a method in accordance with any of Aspects 1-20.

Aspect 38: A non-transitory computer-readable medium comprising computer-executable instructions that, when executed by one or more processors of a processing system, cause the processing system to perform a method in accordance with any of Aspects 1-20.

Aspect 39: A computer program product embodied on a computer-readable storage medium comprising code for performing a method in accordance with any of Aspects 1-20.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a closed subscriber group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a customer premises equipment (CPE), a cellular phone, a smart phone, a personal digital assistant (PDA), a wireless modem, a wireless device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within the entity's service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, generating, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a neural processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a UE (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read-Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, or a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method of wireless communication by a wireless device, comprising:
   determining a duty cycle associated with a transmission scenario based at least in part on a past duty cycle associated with the transmission scenario; and
   transmitting a signal at a transmit power determined based at least in part on the duty cycle and a radio frequency (RF) exposure limit, wherein the transmit power is determined based at least in part on a product of a power limit and a difference of one and the duty cycle.

2. The method of claim 1, wherein the transmission scenario comprises an antenna and a frequency band.

3. The method of claim 1, wherein determining the duty cycle comprises determining the duty cycle using an exponential filter applied to the past duty cycle.

4. The method of claim 1, wherein determining the duty cycle comprises determining the duty cycle as a weighted average of the past duty cycle and a previously determined duty cycle.

5. The method of claim 4, wherein:
   the previously determined duty cycle is smoothed using an exponential filter; and
   the past duty cycle and the previously determined duty cycle are weighted using a smoothing factor.

6. The method of claim 1, wherein determining the duty cycle comprises determining the past duty cycle as a ratio of time used for one or more past transmissions over a time interval.

7. The method of claim 1, wherein determining the duty cycle comprises determining the duty cycle per the transmission scenario among a plurality of transmission scenarios.

8. The method of claim 7, wherein the plurality of transmission scenarios includes different combinations of an antenna and a frequency band among at least one of a plurality of antennas or a plurality of frequency bands.

9. The method of claim 1, further comprising:
   selecting a first value for the power limit if the duty cycle satisfies a threshold; and
   selecting a second value for the power limit if the duty cycle does not satisfy the threshold.

10. The method of claim 1, further comprising:
   determining a maximum allowed transmit power for a time interval in compliance with the RF exposure limit based at least in part on the duty cycle; and
   determining the transmit power that is less than or equal to the maximum allowed transmit power.

11. The method of claim 10, wherein:
   determining the maximum allowed transmit power comprises determining the maximum allowed transmit power as a sum of a maximum averaged power, a power reserve, and a duty cycle power; and
   the duty cycle power is a product of a power limit and a difference of one and the duty cycle.

12. The method of claim 11, further comprising selecting the maximum averaged power in response to detecting that a modem associated with a wireless wide area network is in a sleep mode.

13. The method of claim 12, wherein the sleep mode comprises an airplane mode or a discontinuous reception mode.

14. The method of claim 11, further comprising determining the maximum averaged power based at least in part on one or more past transmit powers over a time window associated with the RF exposure limit.

15. An apparatus for wireless communication, comprising:
   a memory; and
   one or more processors coupled to the memory, the one or more processors being configured to:
      determine a duty cycle associated with a transmission scenario based at least in part on a past duty cycle associated with the transmission scenario, and
      control transmission of a signal at a transmit power determined based at least in part on the duty cycle and a radio frequency (RF) exposure limit, wherein the transmit power is determined based at least in part on a product of a power limit and a difference of one and the duty cycle.

16. The apparatus of claim 15, further comprising a transmitter configured to transmit the signal at the transmit power, wherein the transmission scenario comprises an antenna and a frequency band.

17. The apparatus of claim 15, wherein to determine the duty cycle, the one or more processors are further configured to determine the duty cycle using an exponential filter applied to the past duty cycle.

18. The apparatus of claim 15, wherein to determine the duty cycle, the one or more processors are further configured to determine the duty cycle as a weighted average of the past duty cycle and a previously determined duty cycle.

19. The apparatus of claim 18, wherein:

the previously determined duty cycle is smoothed using an exponential filter; and the past duty cycle and the previously determined duty cycle are weighted using a smoothing factor.

20. The apparatus of claim 15, wherein to determine the duty cycle, the one or more processors are further configured to determine the past duty cycle as a ratio of time used for one or more past transmissions over a time interval.

21. The apparatus of claim 15, wherein to determine the duty cycle, the one or more processors are further configured to determine the duty cycle per the transmission scenario among a plurality of transmission scenarios.

22. The apparatus of claim 21, wherein the plurality of transmission scenarios includes different combinations of an antenna and a frequency band among at least one of a plurality of antennas or a plurality of frequency bands.

23. The apparatus of claim 15, wherein the one or more processors are further configured to:

select a first value for the power limit if the duty cycle satisfies a threshold; and select a second value for the power limit if the duty cycle does not satisfy the threshold.

24. The apparatus of claim 15, wherein the one or more processors are further configured to:

determine a maximum allowed transmit power for a time interval in compliance with the RF exposure limit based at least in part on the duty cycle; and determine the transmit power that is less than or equal to the maximum allowed transmit power.

25. The apparatus of claim 24, wherein:

to determine the maximum allowed transmit power, the one or more processors are further configured to determine the maximum allowed transmit power as a sum of a maximum averaged power, a power reserve, and a duty cycle power; and the duty cycle power is a product of a power limit and a difference of one and the duty cycle.

26. The apparatus of claim 25, wherein the one or more processors are further configured to select the maximum averaged power in response to detecting that a modem associated with a wireless wide area network is in a sleep mode.

27. The apparatus of claim 25, wherein the one or more processors are further configured to determine the maximum averaged power based at least in part on one or more past transmit powers over a time window associated with the RF exposure limit.

28. The apparatus of claim 15, wherein the signal comprises a wireless local area network (WLAN) signal or a Bluetooth signal.

* * * * *